(12) United States Patent
Okuda (10) Patent No.: US 10,002,522 B2
(45) Date of Patent: Jun. 19, 2018

(54) INFORMATION PROCESSING APPARATUS AND TRANSMISSION CONTROL METHOD

(71) Applicant: FUJITSU LIMITED, Kawasaki-shi, Kanagawa (JP)

(72) Inventor: Takuma Okuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/673,534

(22) Filed: Aug. 10, 2017

(65) Prior Publication Data

US 2018/0114432 A1 Apr. 26, 2018

(30) Foreign Application Priority Data

Oct. 20, 2016 (JP) .................................. 2016-206339

(51) Int. Cl.
G08B 1/08 (2006.01)
G08B 29/18 (2006.01)
G08B 13/24 (2006.01)
G07C 9/00 (2006.01)

(52) U.S. Cl.
CPC ........ G08B 29/185 (2013.01); G07C 9/00119 (2013.01); G08B 13/2494 (2013.01)

(58) Field of Classification Search
CPC ...... G08B 29/12; G08B 29/14; G08B 29/145; G08B 29/16; G08B 29/18; G08B 29/185; G08B 25/001; G08B 25/10; G08B 23/00; G08B 21/025; G08B 21/0277; G08B 21/18; G08B 19/00; G08B 13/00; G08B 13/2494; G07C 9/00119

See application file for complete search history.

(56) References Cited

U.S. PATENT DOCUMENTS

| | | | |
|---|---|---|---|
| 9,875,647 B1* | 1/2018 | Tannenbaum | G08B 29/185 |
| 2013/0343202 A1* | 12/2013 | Huseth | H04W 52/0206 |
| | | | 370/244 |
| 2014/0359101 A1* | 12/2014 | Dawes | H04L 41/18 |
| | | | 709/223 |
| 2016/0005284 A1* | 1/2016 | Batra | G08B 13/2462 |
| | | | 340/572.1 |
| 2016/0042630 A1* | 2/2016 | Cho | H04L 12/2825 |
| | | | 340/517 |
| 2016/0232774 A1* | 8/2016 | Noland | G08B 13/1672 |
| 2017/0372597 A1* | 12/2017 | Saintellemy | G08B 29/185 |
| 2018/0047265 A1* | 2/2018 | Rodolico | G08B 13/196 |

FOREIGN PATENT DOCUMENTS

| | | |
|---|---|---|
| JP | 2008-192068 A | 8/2008 |
| JP | 2010-108415 A | 5/2010 |
| JP | 2016-48894 A | 4/2016 |

* cited by examiner

*Primary Examiner* — Ryan Sherwin
(74) *Attorney, Agent, or Firm* — Westerman, Hattori, Daniels & Adrian, LLP

(57) ABSTRACT

An information processing apparatus includes: a processor that executes a process, the process including: detecting that sensor information of any sensor, among a sensor group registered associated with a mobile terminal that transmits sensor information, upon reception of the sensor information from a sensor capable of transmitting a radio signal, has not been acquired from the mobile terminal for a predetermined time or more; and transmitting a signal to a wireless access point to transmit latest sensor information acquired from the sensor to the mobile terminal when detecting that sensor information of any sensor has not been acquired from the mobile terminal for a predetermined time or more.

8 Claims, 10 Drawing Sheets

FIG.4

| SENSOR ID | INSTALLATION PLACE | DETERMINATION CONDITIONS | OWNER | MANAGEMENT ACCESS POINT |
|---|---|---|---|---|
| S01 | FRONT DOOR ON FIRST FLOOR | ≤10°: OPENED 90°≤: CLOSED | XX1 | XXXX |
| S02 | WINDOW ON FIRST FLOOR | ≤15°: OPENED 100°≤: CLOSED | XX1 | XXXX |
| S03 | WINDOW 1 ON SECOND FLOOR | ≤15°: OPENED 100°≤: CLOSED | XX1 | XXXX |
| S04 | WINDOW 2 ON SECOND FLOOR | ≤15°: OPENED 100°≤: CLOSED | XX1 | XXXX |
| ⋮ | | | | |

FIG.5

| SENSOR ID | RECEPTION DATE AND TIME | NOTIFICATION CONTENTS |
|---|---|---|
| S03 | 2016/10/2 7:00 | CLOSED |
| S03 | 2016/10/2 6:58 | OPENED |
| ⋮ | | |
| S01 | 2016/10/1 20:00 | CLOSED |
| ⋮ | | |
| S02 | 2016/10/1 18:00 | OPENED |
| ⋮ | | |
| S04 | 2016/10/1 17:00 | OPENED |
| ⋮ | | |

| USER ID | TERMINAL ID | POINT OF CONTACT | USER GROUP |
|---------|-------------|------------------|------------|
| 0001    | XX1         | XXXXX            | YG01       |
| 0002    | XX2         | XXXXX            | YG01       |
| ...     |             |                  |            |

FIG.10

| SENSOR ID | INSTALLATION PLACE | DETERMINATION CONDITIONS | OWNER | MANAGEMENT ACCESS POINT | USER GROUP |
|---|---|---|---|---|---|
| S01 | FRONT DOOR ON FIRST FLOOR | ≤10°: OPENED 90°≤: CLOSED | XX1 | xxxx | YG01 |
| S02 | WINDOW ON FIRST FLOOR | ≤15°: OPENED 100°≤: CLOSED | XX1 | xxxx | YG01 |
| S03 | WINDOW 1 ON SECOND FLOOR | ≤15°: OPENED 100°≤: CLOSED | XX1 | xxxx | YG01 |
| S04 | WINDOW 2 ON SECOND FLOOR | ≤15°: OPENED 100°≤: CLOSED | XX1 | xxxx | YG01 |
| ⋮ | | | | | |

FIG.11

| SENSOR ID | RECEPTION DATE AND TIME | NOTIFICATION CONTENTS | SOURCE TERMINAL ID |
|---|---|---|---|
| S03 | 2016/10/2 7:00 | CLOSED | XX2 |
| S03 | 2016/10/2 6:58 | OPENED | XX2 |
| ⋮ | ⋮ | ⋮ | ⋮ |
| S01 | 2016/10/1 20:00 | CLOSED | XX1 |
| ⋮ | ⋮ | ⋮ | ⋮ |
| S02 | 2016/10/1 18:00 | OPENED | XX1 |
| ⋮ | ⋮ | ⋮ | ⋮ |
| S04 | 2016/10/1 17:00 | OPENED | XX1 |
| ⋮ | ⋮ | ⋮ | ⋮ |

FIG.12

| SENSOR ID | INSTALLATION PLACE | DETERMINATION CONDITIONS | OWNER | MANAGEMENT ACCESS POINT | USER GROUP | SENSOR GROUP ID |
|---|---|---|---|---|---|---|
| S01 | FRONT DOOR ON FIRST FLOOR | ≤10°: OPENED 90°≤: CLOSED | XX1 | XXXX | YG01 | SG01 |
| S02 | WINDOW ON FIRST FLOOR | ≤15°: OPENED 100°≤: CLOSED | XX1 | XXXX | YG01 | SG01 |
| S03 | WINDOW 1 ON SECOND FLOOR | ≤15°: OPENED 100°≤: CLOSED | XX1 | XXXX | YG01 | SG02 |
| S04 | WINDOW 2 ON SECOND FLOOR | ≤15°: OPENED 100°≤: CLOSED | XX1 | XXXX | YG01 | SG02 |
| ... | | | | | | |

FIG.13

INFORMATION PROCESSING APPARATUS AND TRANSMISSION CONTROL METHOD

CROSS-REFERENCE TO RELATED APPLICATIONS

This application is based upon and claims the benefit of priority of the prior Japanese Patent Application No. 2016-206339, filed on Oct. 20, 2016, the entire contents of which are incorporated herein by reference.

FIELD

The embodiments discussed herein are related to an information processing apparatus, a computer-readable recording medium, and a transmission control method.

BACKGROUND

A system for managing home security has been proposed. In such a system, a sensor that can detect a locking state such as a direction of a key is installed on a front door and windows of a home, thereby monitoring the locking state of the front door and the windows.

For example, it is conceivable that, when a resident approaches a front door or a window, a sensor transmits information of a locking state to a mobile terminal such as a mobile phone held by the resident by near field communication such as Bluetooth®, and the mobile terminal memorizes the information to manage the security.

However, the resident may change the locking state of the front door and windows without holding the mobile terminal.

Therefore, for example, it is conceivable to alert the sensor that does not notify any information for a certain period of time or more by the mobile terminal.

However, in this case, even if there is no change in the locking state, an unnecessary alert may be generated in the mobile terminal.

SUMMARY

According to an aspect of an embodiment, an information processing apparatus includes: a processor that executes a process, the process including: detecting that sensor information of any sensor, among a sensor group registered associated with a mobile terminal that transmits sensor information, upon reception of the sensor information from a sensor capable of transmitting a radio signal, has not been acquired from the mobile terminal for a predetermined time or more; and transmitting a signal to a wireless access point to transmit latest sensor information acquired from the sensor to the mobile terminal when detecting that sensor information of any sensor has not been acquired from the mobile terminal for a predetermined time or more.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The present invention is not limited to the embodiments. The respective embodiments can be combined with each other as appropriate to the extent that processing contents thereof are not contradictory to one another.

[a] First Embodiment

System Configuration

Figure 1:
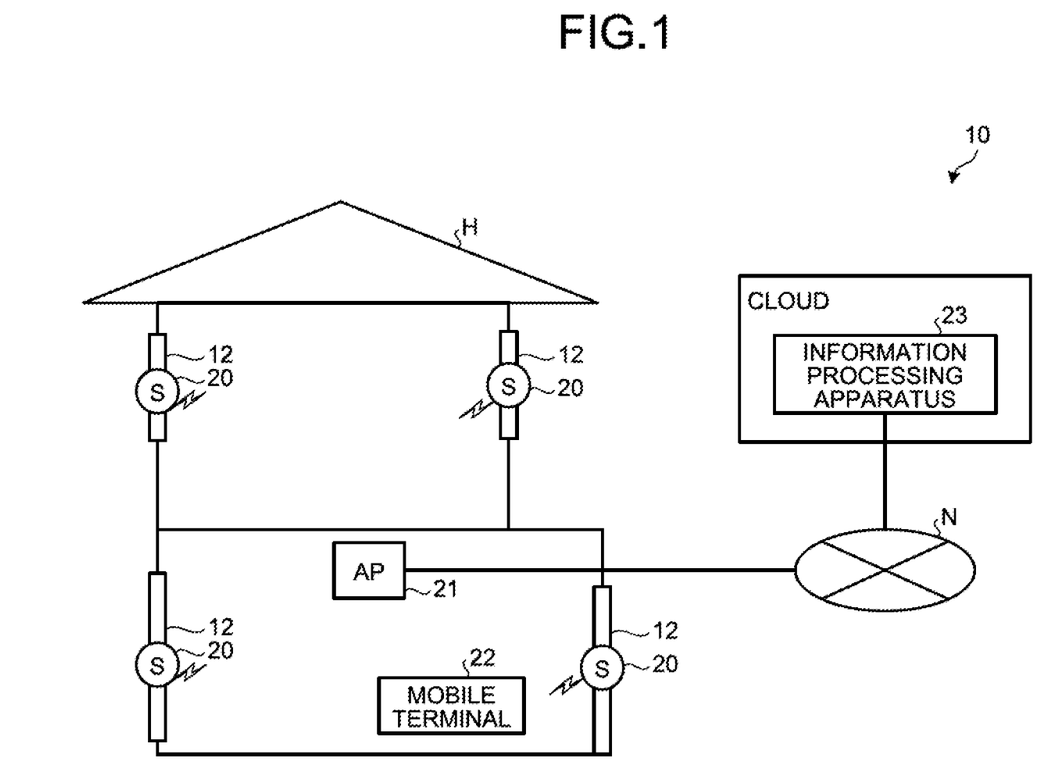
FIG. 1 is a diagram illustrating an example of a schematic configuration of a system according to a first embodiment.

An example of a system 10 according to a first embodiment is described first. FIG. 1 is a diagram illustrating an example of a schematic configuration of a system according to the first embodiment. The system 10 is a system that supports management of the security of a monitoring target home H.

In the system 10, a sensor device 20 is installed on a monitoring target of the security of the monitoring target home H. For example, the sensor device 20 that can detect a locking state is set in a portion where locking is performed, such as windows and a front door of the home H. In the example illustrated in FIG. 1, sensor devices 20 are set at a thumb-turn portion of a key for a front door 11 of the home H, and lock (crescent) portions of windows 12 on the first and second floors. The sensor device 20 can be incorporated in a part to be locked or can be installed later.

The sensor device 20 includes a sensor that can detect the locking state, a wireless communication unit that can perform near field communication such as Bluetooth® or ZigBee®, and a power supply unit such as a button battery that supplies power to the sensor and the wireless communication unit. For example, when the opened or closed locking state is changed by rotation, an acceleration sensor or a sensor capable of detecting an angle with respect to a direction of a gravitational force (for example, whether the key is in a vertical orientation or a lateral orientation) is provided in the sensor device 20. The sensor device 20 periodically transmits sensor information including state information indicating the locking state and identification information such as a sensor ID of the sensor device 20 by near field communication.

In the system 10, an access point (denoted as "AP" in FIG. 1) 21 is arranged in the home H. The access point 21 is, for example, a wireless router that can perform wireless communication by a wireless LAN (Local Area Network) such as Wi-Fi, or near field communication. The access point 21 is arranged at a position capable of communicating with the respective sensor devices 20. The access point 21 can be arranged in plural in the home H.

In the system 10, a resident of the home H holds a mobile terminal 22. For example, the mobile terminal 22 is a mobile phone or a smartphone that can perform wireless communication by the wireless LAN or the like, near field communication, or mobile communication performed by a mobile communication network or the like, respectively.

The system 10 includes an information processing apparatus 23 as a cloud-side system. The information processing apparatus 23 is a computer that provides a service related to the security of the home H to a user. The information processing apparatus 23 can be implemented as one computer, or can be implemented as a computer system formed with a plurality of computers. In the present embodiment, a case where the information processing apparatus 23 is one computer is described as an example.

The access point 21, the mobile terminal 22, and the information processing apparatus 23 are communicably connected to each other via a network N. As one mode of the network N, an arbitrary type of communication network such as a LAN, a VPN (Virtual Private Network), and a mobile communication network can be employed regardless of being wired or wireless.

The resident of the home H moves around inside the home H. For example, when changing the locking state of the home H, the resident comes closer to the front door 11 or the windows 12 on the first and second floors. If the resident holds the mobile terminal 22 when changing the locking state, the mobile terminal 22 can perform near field communication with the sensor device 20 installed at a position where the locking state is changed, and receives the sensor information from the sensor device 20. When the resident is in the home H, the mobile terminal 22 can perform near field communication with any of the sensor devices 20, and receives the sensor information from the sensor device 20. Upon reception of the sensor information, the mobile terminal 22 transmits the received sensor information to the information processing apparatus 23.

The information processing apparatus 23 memorizes the received sensor information. The information processing apparatus 23 determines whether the sensor information of any sensor device 20, among the sensor devices 20 arranged in the home H, has not been acquired from the mobile terminal 22 for a predetermined time or more. For example, the information processing apparatus 23 determines, as for the sensor devices 20 arranged in the home H, whether the sensor information of any of the sensor devices 20 has been received at a predetermined time interval. The predetermined time is set as 5 minutes, for example. The predetermined time can be changed from outside, and can be changed depending on the status of the home H. When having detected that the sensor information of any sensor device 20 has not been acquired from the mobile terminal 22, the information processing apparatus 23 transmits a signal to the access point 21 in order to transmit the latest sensor information acquired from the sensor device 20 to the mobile terminal 22. For example, the information processing apparatus 23 transmits a transmission instruction signal to the access point 21 in order to acquire the pieces of latest sensor information from the respective sensor devices 20 and to transmit the acquired pieces of sensor information to the mobile terminal 22.

Upon reception of the transmission instruction signal from the information processing apparatus 23, the access point 21 acquires the pieces of sensor information from the respective sensor devices 20. The access point 21 transmits the acquired pieces of sensor information of the respective sensor devices 20 to the mobile terminal 22. The access point 21 can transmit the acquired pieces of sensor information of the sensor devices 20 to the information processing apparatus 23, and the information processing apparatus 23 can transmit the pieces of sensor information of the respective sensor devices 20 to the mobile terminal 22.

Accordingly, when the resident holding the mobile terminal 22 exits the home H, the system 10 can notify the resident of information related to the locking state. Further, in the system 10, if the sensor information of any sensor device 20 in the home H has been notified to the information processing apparatus 23 within a predetermined time, the signal instructing to transmit the sensor information is not transmitted from the information processing apparatus 23. Due to this configuration, in the system 10, generation of an unnecessary alert can be suppressed when the resident is in the home H. Further, in the system 10, it can be suppressed that a state such that the resident is temporarily out of the home H, such as a case where the resident exits to check a mailbox outside the home H, is detected erroneously as the resident being out of the home H, and information related to the locking state can be notified to the resident when the resident exits home H. That is, the system 10 can notify the information of the home H in the state that the resident is away from the home H, where notification of the information is supposed to be made.

Information Processing Apparatus

Figure 2:
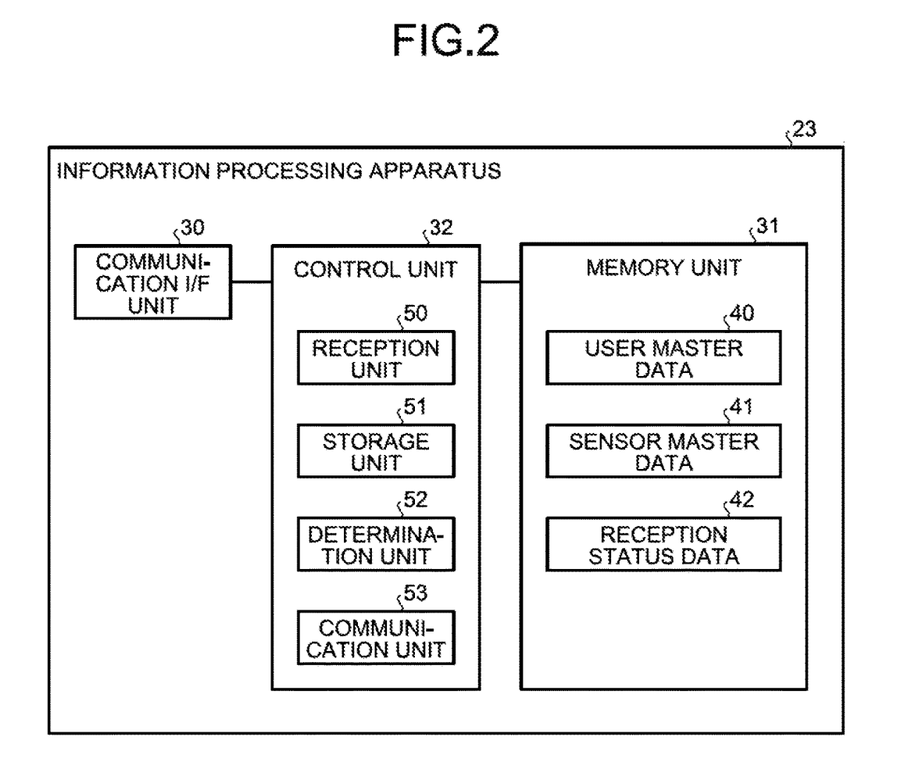
FIG. 2 is a diagram illustrating an example of a configuration of an information processing apparatus according to the first embodiment.

A configuration of the information processing apparatus 23 according to the first embodiment is described next. FIG. 2 is a diagram illustrating an example of a configuration of the information processing apparatus according to the first embodiment. As illustrated in FIG. 2, the information processing apparatus 23 includes a communication I/F (interface) unit 30, a memory unit 31, and a control unit 32.

The communication I/F unit 30 is an interface that executes control of communication with other devices. The communication I/F unit 30 transmits and receives various pieces of information to and from other devices via the network N. As the communication I/F unit 30, a network interface card such as a LAN card can be employed.

The memory unit 31 is a memory device such as a hard disk, an SSD (Solid State Drive), or an optical disk. The memory unit 31 can be a semiconductor memory that can rewrite data, such as a RAM (Random Access Memory), a flash memory, or an NVSRAM (Non Volatile Static Random Access Memory). Further, the memory unit 31 can be a server device that memorizes and provides data.

The memory unit 31 memorizes various programs. The memory unit 31 also memorizes various types of data to be used in the various programs. For example, the memory unit 31 memorizes user master data 40, sensor master data 41, and reception status data 42.

Figure 3:
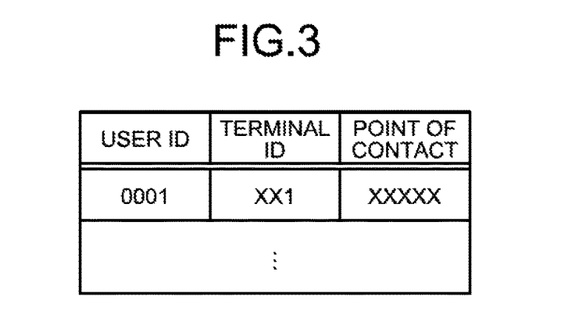
FIG. 3 is a diagram illustrating an example of a data configuration of user master data according to the first embodiment.

The user master data 40 is data in which various pieces of information related to a resident as a user are memorized. FIG. 3 is a diagram illustrating an example of a data configuration of user master data according to the first embodiment. As illustrated in FIG. 3, the user master data 40 includes items such as "user ID", "terminal ID", and "point of contact". The respective items of the user master data 40 illustrated in FIG. 3 are only examples, and other items can be included.

The item of "user ID" is a region in which identification information for identifying a resident as a user is memorized. A unique user ID formed by combining one of or both of characters and numbers is given to the resident who lives in the monitoring target home H as the identification information. The user ID given to the resident is memorized in the item of "user ID". The item of "terminal ID" is a region in which the identification information of the mobile terminal 22 held by the resident is memorized. A terminal ID such as a manufacturing number is set to the mobile terminal 22 as the identification information. The terminal ID for identifying the mobile terminal 22 is memorized in the item of "terminal ID". The item of "point of contact" is a region in which the point of contact at the time of transmitting information to the resident is memorized. The point of contact can be any address to which information can be notified to the mobile terminal 22, and can be an e-mail address, for example. The point of contact to transmit information to the resident is memorized in the item of "point of contact". For example, when the mobile terminal 22 is a mobile phone or a smartphone, the point of contact can be a phone number or an e-mail address. For example, in the example illustrated in FIG. 3, it is illustrated that a resident having a user ID "0001" has "XX1" as the terminal ID and "XXXXX" as the point of contact.

Figure 4:
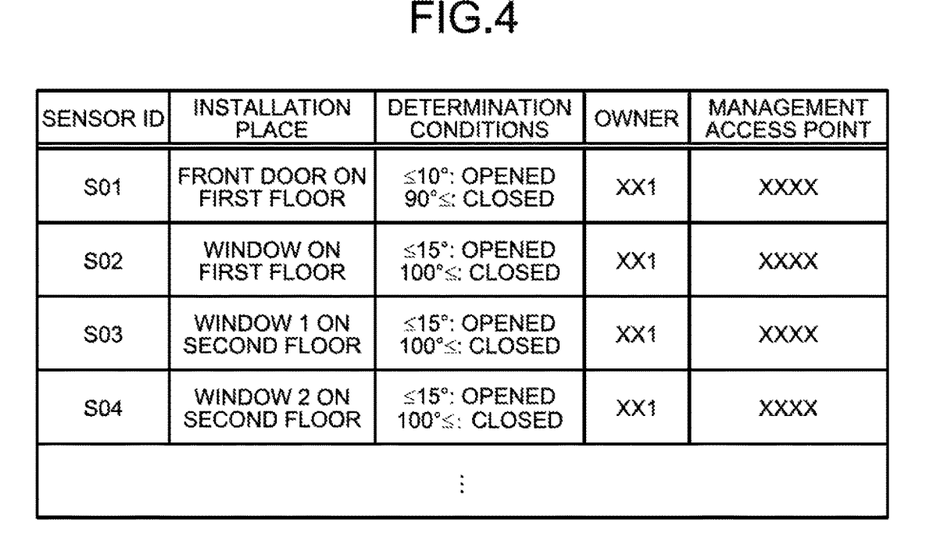
FIG. 4 is a diagram illustrating an example of a data configuration of sensor master data according to the first embodiment.

The sensor master data 41 is data in which various pieces of information related to the sensor device 20 are memorized. FIG. 4 is a diagram illustrating an example of a data configuration of the sensor master data according to the first embodiment. As illustrated in FIG. 4, the sensor master data 41 includes "sensor ID", "installation place", "determination conditions", "owner", and "management access point". The respective items in the sensor master data 41 are only examples, and other items can be included.

The item of "sensor ID" is a region in which the identification information for identifying the sensor device 20 is memorized. A unique sensor ID combining one of or both of characters and numbers is given to the sensor device 20 as the identification information. For example, a unique sensor ID such as a manufacturing number is given to the sensor device 20. The sensor ID given to the sensor device 20 is memorized in the item of "sensor ID". The item of "installation place" is a region in which information of an installation place of the sensor device 20 is memorized. The item of "determination conditions" is a region in which determination conditions of state information included in the sensor information transmitted from the sensor device 20 are memorized. In the present embodiment, it is determined whether the locking state of an object where the sensor device 20 is arranged is opened or closed based on the state information. The determination conditions to determine whether the locking state is opened or closed are memorized in the item of "determination conditions". The item of "owner" is a region in which the mobile terminal 22 associated with the sensor device 20 is memorized. For example, the mobile terminal 22 is associated with the sensor device 20 by using the terminal ID of the mobile terminal 22 or the user ID of the resident holding the mobile terminal 22. The terminal ID of the mobile terminal 22 associated with the sensor device 20 is memorized in the item of "owner". The item of "management access point" is a region in which the identification information of the access point 21 for managing the sensor devices 20 is memorized. In the present embodiment, the access point 21 arranged in the home H where the sensor devices 20 are arranged is designated as the access point 21 to manage the sensor devices 20. An ID is set to the access point 21 as the identification information. For example, the ID can be an address in order to access the access point 21. An address in order to access the access point 21 in the home H where the sensor devices 20 are arranged is memorized in the item of "management access point". For example, in the example in FIG. 4, it is indicated that the sensor device 20 having a sensor ID "S01" is installed at the "front door on first floor", and the locking state is determined as "opened" if an angle notified as the state information is equal to or less than 10 degrees, and the locking state is determined as "closed" if the angle is equal to or larger than 90 degrees. In the sensor device 20 having the sensor ID "S01", it is indicated that the terminal ID of the mobile terminal 22 associated therewith is "XX1", and the address of the access point 21 to manage the sensor devices 20 is "XXXX".

Figure 5:
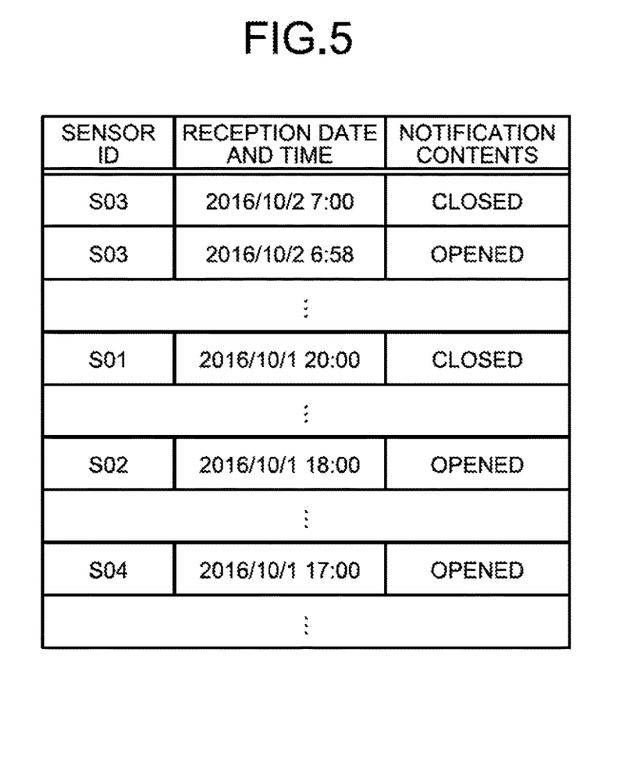
FIG. 5 is a diagram illustrating an example of a data configuration of reception status data according to the first embodiment.

The reception status data 42 is data in which information related to the reception status of the sensor information is memorized. Information related to the reception status such as reception date and time is memorized in the reception status data 42 every time the sensor information is received. FIG. 5 is a diagram illustrating an example of a data configuration of the reception status data according to the first embodiment. As illustrated in FIG. 5, the reception status data 42 includes items of "sensor ID", "reception date and time", and "notification contents". The respective items in the reception status data illustrated in FIG. 5 are only examples, and other items can be included.

The item of "sensor ID" is a region in which the sensor ID of the sensor device 20, which is a source of the received sensor information, is memorized. The item of "reception date and time" is a region in which date and time when the sensor information has been received are memorized. The item of "notification contents" is a region in which the notification contents notified by the sensor information are memorized. In the present embodiment, information of the locking state as a result of determination of the state information included in the sensor information based on the determination conditions is memorized therein. For example, in the example in FIG. 5, it is indicated that the sensor information has been received at 7:00 on Oct. 2, 2016 from the sensor device 20 having the sensor ID "S03", and the locking state is "closed".

Referring back to FIG. 2, the control unit 32 is a device that controls the information processing apparatus 23. As the control unit 32, an electronic circuit such as a CPU (Central Processing Unit) or an MPU (Micro Processing Unit), or an integrated circuit such as an ASIC (Application Specific Integrated Circuit) or an FPGA (Field Programmable Gate Array) can be employed. The control unit 32 includes an internal memory that stores therein a program specifying various process procedures and control data, and performs various processes by using the program and the control data. The control unit 32 functions as various processing units by operating the various programs. For example, the control unit 32 includes a reception unit 50, a storage unit 51, a determination unit 52, and a communication unit 53.

The reception unit 50 receives registration of various pieces of information. For example, the reception unit 50 receives registration of the various pieces of information to be memorized in the user master data 40 and the sensor master data 41. The various pieces of information to be memorized in the user master data 40 and the sensor master data 41 can be registered by the resident living in the home H, or can be registered by a manager or the like who operates the system 10. For example, upon reception of access from the mobile terminal 22, the reception unit 50 transmits information of various operation screens to an access source, and causes the access source to display an operation screen. The reception unit 50 receives registration of the various pieces of information related to the resident or the sensor device 20 from the operation screen.

For example, a unique user ID is respectively given to the residents living in the home H. The resident uses the mobile terminal 22 to access the information processing apparatus 23, and logs in the operation screen by using the user ID. The resident registers the terminal ID of the mobile terminal 22 held by the resident and the point of contact such as an e-mail address from the operation screen.

The reception unit 50 registers the terminal ID and the point of contact registered on the operation screen in the user master data 40 in association with the user ID.

The resident installs the sensor device 20 at positions where locking of the windows 12 and the front door 11 of the home H is performed. The resident then uses the mobile terminal 22 to access the information processing apparatus 23, and logs in the operation screen by using the user ID. The resident registers the various pieces of information related to the installed sensor devices 20 from the operation screen. For example, the resident registers the sensor ID such as the manufacturing number of the installed sensor device 20, the installation place, and the determination conditions from the operation screen. The resident also registers the terminal ID of the mobile terminal 22 to be associated with the sensor device 20, and an address for accessing the access point 21 arranged in the home H. For example, the resident registers the respective sensor devices 20 arranged in the home H in association with the mobile terminal 22 held by the resident.

The reception unit 50 resisters the sensor ID, the installation place, the determination conditions, the terminal ID, and the address of the access point 21 registered on the operation screen in the sensor master data 41. As the determination conditions, conditions can be input, or specification of an opened and closed state can be performed while corresponding to opening and closing at the position where locking is performed. For example, the resident specifies the opened state from the operation screen while assuming that the locking state of the windows 12 and the front door 11 where the sensor devices 20 are installed is opened. Further, the resident specifies the closed state from the operation screen while assuming that the locking state of the windows 12 and the front door 11 where the sensor devices 20 are installed is closed. The reception unit 50 can calculate the determination conditions based on the locking state specified on the operation screen and the state information included in the sensor information transmitted from the sensor device 20, and can register the calculated determination conditions in the sensor master data 41. For example, the reception unit 50 calculates the determination conditions based on the state information included in the sensor information transmitted from the sensor device 20 when the current state is specified as the opened state, and the state information included in the sensor information transmitted from the sensor device 20 when the current state is specified as the closed state. For example, when the angle indicating the locking state at the time of being specified as the opened state is 0 degree, and the angle indicating the locking state at the time of being specified as the closed state is 120 degrees, the reception unit 50 calculates a threshold of the angle determined as being opened and a threshold of the angle determined as being closed between 0 degree and 120 degrees. For example, the reception unit 50 calculates an angle obtained by adding a predetermined angle from 0 degree toward the opening side as the threshold of the angle determined as being opened, and calculates an angle obtained by subtracting a predetermined angle from 120 degrees toward the opening side as the threshold of the angle determined as being closed. For example, the reception unit 50 normalizes an angle range from 0 degree to 120 degrees to a range of 0 to 1, and calculates an angle corresponding to 0.1 as the threshold of the angle determined as being opened, and calculates an angle corresponding to 0.9 as the threshold of the angle determined as being closed.

The storage unit 51 stores various pieces of information. For example, upon reception of the sensor information of the sensor device 20 from the mobile terminal 22, the storage unit 51 reads the determination conditions corresponding to the sensor ID included in the received sensor information from the sensor master data 41. The storage unit 51 uses the read determination conditions to determine the state information included in the sensor information and specifies whether the locking state notified by the sensor information is opened or closed. The storage unit 51 stores the sensor ID included in the sensor information, the reception date and time of the sensor information, and the specified locking state in the reception status data 42.

The determination unit 52 performs various determinations. For example, the determination unit 52 determines whether the sensor information of any sensor device 20, among the sensor devices 20 registered in association with the mobile terminal 22, has not been acquired from the mobile terminal 22 for a predetermined time or more. For example, the determination unit 52 specifies the sensor ID of the sensor device 20 registered in association with the mobile terminal 22 by referring to the sensor master data 41. The determination unit 52 then determines whether the sensor information of any sensor device 20 registered in association with the mobile terminal 22 has been received by referring to the reception status data 42 at a predetermined time interval, for each mobile terminal 22. If the sensor information of any sensor device 20 registered in association with the mobile terminal 22 has not been received, the determination unit 52 determines that the sensor information of any sensor device 20 has not been acquired from the mobile terminal 22 for the predetermined time or more.

The communication unit 53 performs various transmissions. For example, when the determination unit 52 determines that the sensor information of any sensor device 20 has not been acquired from the mobile terminal 22, the communication unit 53 transmits a signal of transmission instruction to the access point 21 that manages the sensor devices 20 associated with the mobile terminal 22 to transmit the sensor information. For example, the communication unit 53 reads the address of the point of contact of the mobile terminal 22 associated with the sensor device 20 from the user master data 40, and transmits the address of the point of contact together with the transmission instruction.

Upon reception of the signal of the transmission instruction from the information processing apparatus 23, the access point 21 acquires the sensor information from the respective sensor devices 20. The access point 21 can request the respective sensor devices 20 to transmit the sensor information to acquire the sensor information. The access point 21 transmits the pieces of acquired sensor information of the respective sensor devices 20 to the address of the point of contact.

Accordingly, when the resident holding the mobile terminal 22 exits the home H, the mobile terminal 22 can acquire the latest sensor information of the respective sensor devices 20. For example, even if the resident changes the locking state of the front door 11 and the windows 12 without holding the mobile terminal 22 before exiting, the resident can confirm the latest locking state of the front door 11 and the windows 12. If the resident holding the mobile terminal 22 is in the home H, the sensor information of any of the sensor devices 20 is transmitted to the information processing apparatus 23 via the mobile terminal 22. Due to this configuration, for example, even if there is any sensor device 20 from which information has not been notified for a predetermined time or more, generation of an unnecessary alert can be suppressed.

Process Flow

Figure 6:
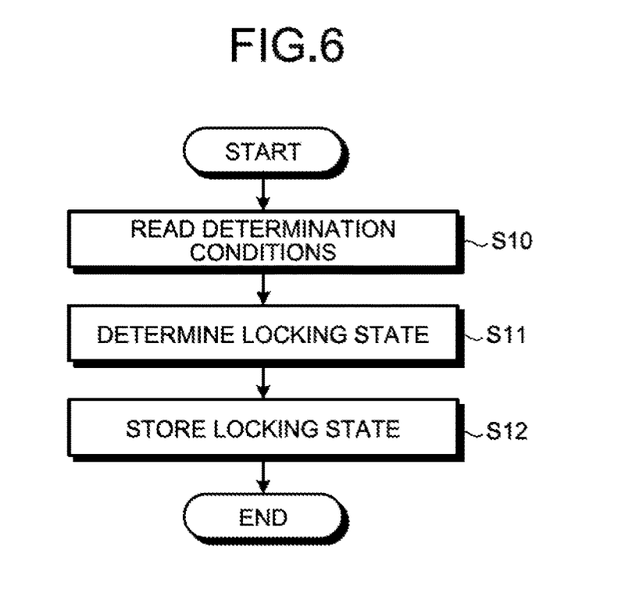
FIG. 6 is a flowchart illustrating a flow of a storing process.

A flow of various processes performed by the information processing apparatus 23 according to the present embodiment is described next. A flow of a storing process in which the received sensor information is stored by the information processing apparatus 23 is described first. FIG. 6 is a flowchart illustrating a flow of the storing process. The storing process illustrated in FIG. 6 is performed at a predetermined timing, for example, at a timing of receiving the sensor information.

The storage unit 51 reads the determination information corresponding to the sensor ID included in the received sensor information from the sensor master data 41 (S10). The storage unit 51 uses the read determination conditions to determine the state information included in the sensor information, and specifies whether the locking state notified by the sensor information is opened or closed (S11). The storage unit 51 stores the sensor ID included in the sensor information, the received date and time of the sensor information, and the specified locking state in the reception status data 42 (S12), and the process is ended.

Figure 7:
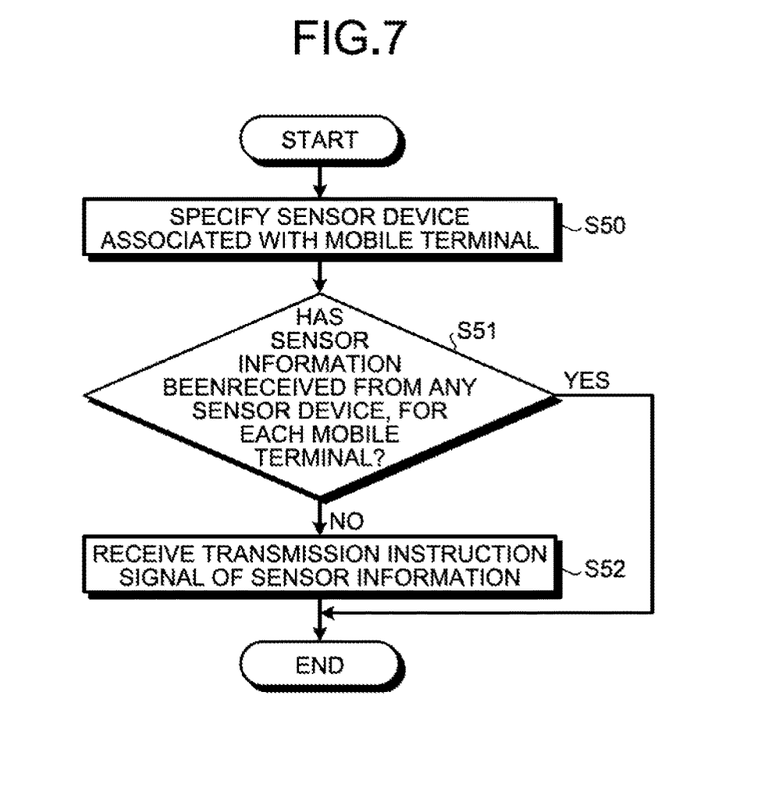
FIG. 7 is a flowchart illustrating a flow of a transmission control process.

A flow of a transmission control process in which the information processing apparatus 23 instructs transmission of information when the sensor information of any sensor device 20 has not been acquired from the mobile terminal 22 for a predetermined time or more is described next. FIG. 7 is a flowchart illustrating a flow of the transmission control process. The transmission control process illustrated in FIG. 7 is periodically performed at a predetermined timing, for example, at a predetermined time interval.

The determination unit 52 specifies the sensor IDs of the sensor devices 20 registered in association with the mobile terminal 22 by referring to the sensor master data 41 (S50). The determination unit 52 determines whether the sensor information of any of the sensor devices 20 registered in association with the mobile terminal 22 has been received within a predetermined time since the current date and time, for each mobile terminal 22 (S51). If there is no mobile terminal 22 from which the sensor information of any of the sensor devices 20 registered in association with the mobile terminal 22 has not been received (YES at S51), the process is ended.

On the other hand, if there is a mobile terminal 22 from which the sensor information of any of the sensor devices 20 registered in association with the mobile terminal 22 has not been received (NO at S51), the communication unit 53 transmits a signal of transmission instruction to transmit the latest sensor information (S52), and the process is ended. For example, the communication unit 53 reads from the sensor master data 41 the address of the contact information of the mobile terminal 22 from which the sensor information of any of the sensor devices 20 registered in association with the mobile terminal 22 has not been received, and transmits the address of the contact information together with the transmission instruction.

Effect

When detecting that the sensor information of any sensor device 20, among the sensor devices 20 registered in association with the mobile terminal 22, has not been acquired from the mobile terminal 22 for a predetermined time or more, the information processing apparatus 23 according to the present embodiment transmits a signal to the access point 21 to transmit the latest sensor information to the mobile terminal 22. Accordingly, the information processing apparatus 23 can suppress generation of an unnecessary alert.

Two or more sensor devices 20 are associated with the mobile terminal 22. When detecting that the sensor information of two or more sensor devices 20 has not been acquired from the mobile terminal 22, the information processing apparatus 23 transmits a signal to the access point 21 to transmit the latest sensor information to the mobile terminal 22. When the sensor information of any of two or more sensor devices 20 has been acquired, because the information processing apparatus 23 does not transmit the signal while assuming that the resident is in the home H, the information processing apparatus 23 can suppress generation of an unnecessary alert.

The sensor device 20 is installed at a position of exiting and entering the home H. Accordingly, the security state of the home H can be determined based on the sensor information from the sensor device 20.

The sensor device 20 detects information related to a motion that is detectable by a sensor. Accordingly, the locking state of a portion where locking is performed by rotation, such as the windows 12 and the front door 11, can be detected.

[b] Second Embodiment

Figure 8:
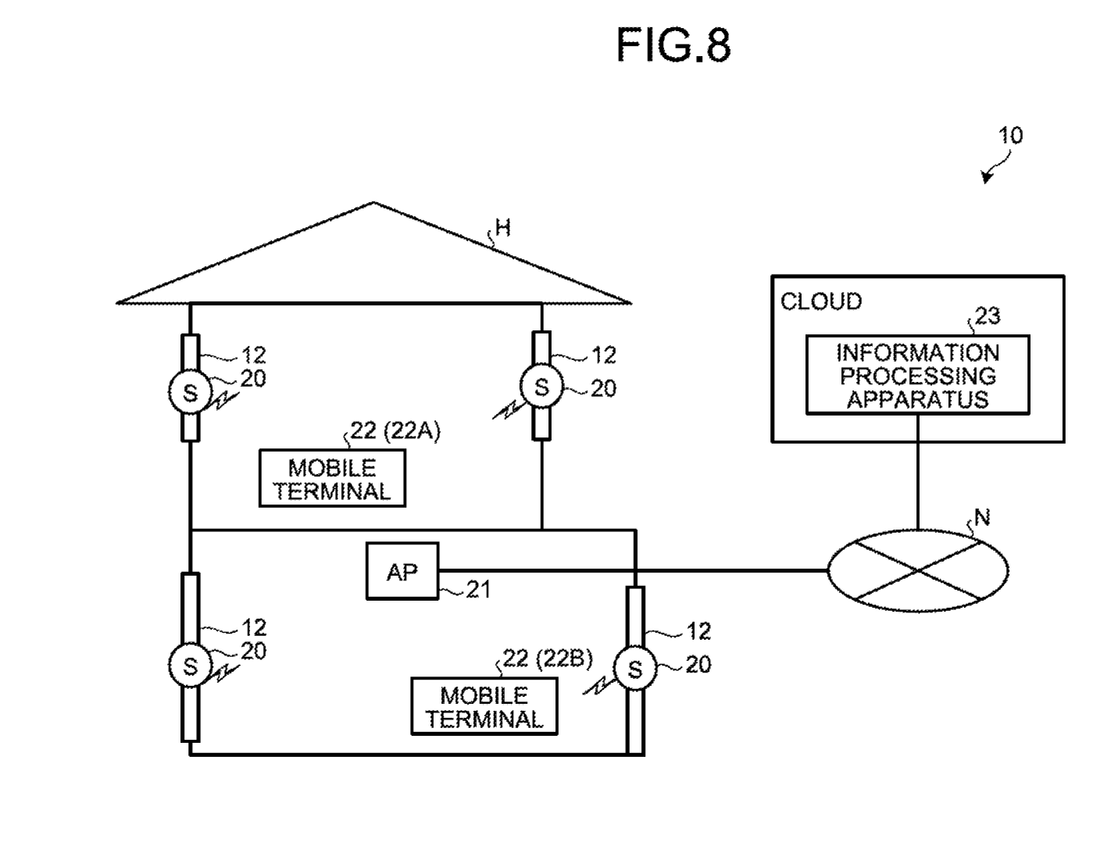
FIG. 8 is a diagram illustrating an example of a schematic configuration of a system according to a second embodiment.

A second embodiment is described next. FIG. 8 is a diagram illustrating an example of a schematic configuration of a system according to the second embodiment. A plurality of residents live in the monitoring target home H, and each of the residents has the mobile terminal 22. The example illustrated in FIG. 8 illustrates a case where two residents live in the home H, and the two residents respectively hold a mobile terminal 22A and a mobile terminal 22B. In the information processing apparatus 23 according to the second embodiment, it is configured that a plurality of users can be grouped and managed as a user group. For example, a plurality of residents living in the monitoring target home H are managed as a group.

The configuration of the information processing apparatus 23 according to the second embodiment is described. The configuration of the information processing apparatus 23 according to the second embodiment is substantially identical to that of the first embodiment illustrated in FIG. 2, and thus parts different from the first embodiment are mainly described.

Figure 9:
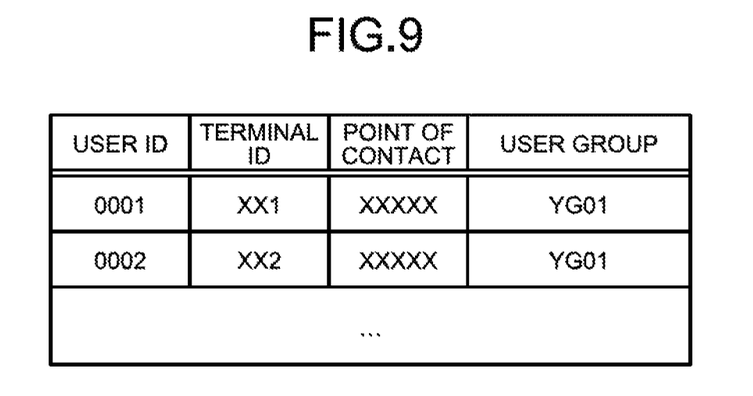
FIG. 9 is a diagram illustrating an example of a data configuration of user master data according to the second embodiment.

The user master data 40 according to the second embodiment is configured to be capable of managing a user group. For example, the user master data 40 manages the plurality of residents living in the monitoring target home H as the user group. FIG. 9 is a diagram illustrating an example of a data configuration of the user master data according to the second embodiment. As illustrated in FIG. 9, the user master data 40 further includes an item of "user group ID".

The item of "user group ID" is a region in which the identification information for identifying the user group to which the resident belongs is memorized. A unique user group ID combining one of or both of characters and numbers is given to the user group as the identification information. The group ID of the user group to which the residents belong is memorized in the item of "user group ID". For example, the example of FIG. 9 indicates that a resident having a user ID "0001" and a resident having a user ID "0002" belong to a user group having a user group ID "YG01".

Figure 10:
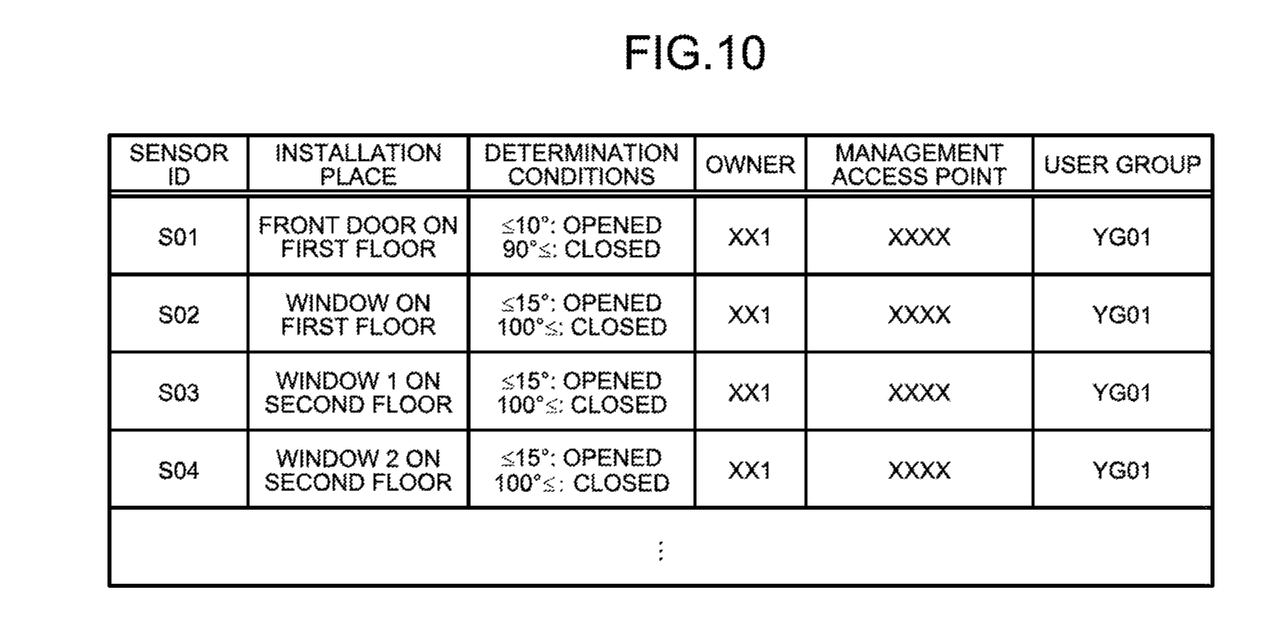
FIG. 10 is a diagram illustrating an example of a data configuration of sensor master data according to the second embodiment.

FIG. 10 is a diagram illustrating an example of a data configuration of the sensor master data according to the second embodiment. As illustrated in FIG. 10, sensor master data 41 further includes an item of "user group ID". The item of "user group ID" is a region in which the user group ID of the user group associated with the sensor device 20 is memorized. In the present embodiment, by associating the user group ID with the sensor device 20, the plurality of mobile terminals 22 of residents belonging to the user group are associated with the sensor device 20.

Figure 11:
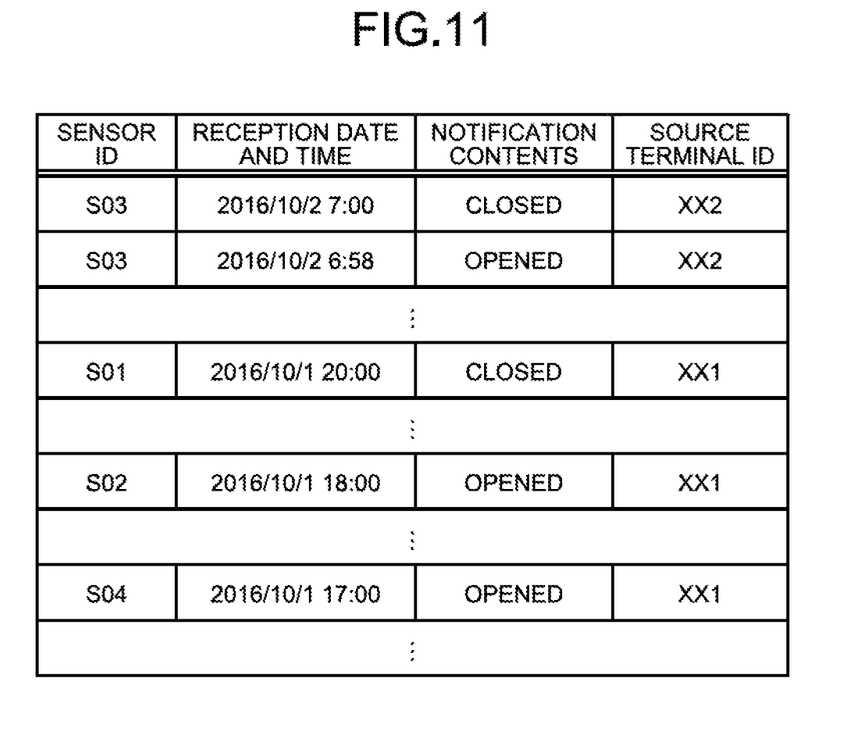
FIG. 11 is a diagram illustrating an example of a data configuration of reception status data according to the second embodiment.

FIG. 11 is a diagram illustrating an example of a data configuration of the reception status data according to the second embodiment. As illustrated in FIG. 11, the reception status data 42 further includes an item of "source terminal ID". The item of "source terminal ID" is a region in which the terminal ID of the mobile terminal 22 that has transmitted (relayed) the sensor information of the sensor device 20 is memorized.

The reception unit 50 receives registration of the user IDs of the residents in the same user group from the operation screen. When other residents living in the same home H are grouped, the residents register the user ID of the resident in the same user group. The reception unit 50 registers the same user group ID in the item of "user group ID" in the user master data 40 of the respective residents registered as the same user group. The user group ID can be set by the resident or can be added automatically by the information processing apparatus 23.

The reception unit 50 receives registration of various pieces of information related to the sensor device 20. For example, the reception unit 50 receives registration of the sensor ID of the installed sensor device 20, the installation place, the determination conditions, the terminal ID of the mobile terminal 22 to be associated with the sensor device 20, and the address of the access point 21 arranged in the home H from the operation screen. The reception unit 50 registers the sensor ID, the installation place, the determination conditions, the terminal ID, and the address of the access point 21 registered on the operation screen in the sensor master data 41. At this time, the reception unit 50 specifies the user group ID corresponding to the registered terminal ID by referring to the user master data 40, and registers the specified user group ID in the sensor master data 41.

Upon reception of the sensor information of the sensor device 20 from the mobile terminal 22, the storage unit 51 further stores the terminal ID of the mobile terminal 22 that has transmitted the sensor information in the reception status data 42.

When the residents have been grouped, the determination unit 52 determines whether the sensor information of the sensor device 20 registered in association with each mobile terminal 22 has not been received for a predetermined time or more from any of the mobile terminals 22 respectively held by the residents belonging to the user group. For example, the determination unit 52 specifies the terminal IDs of the mobile terminals 22 of the residents belonging to the user group and the user group ID for each user group, by referring to the user master data 40. Further, the determination unit 52 specifies the sensor ID of the sensor device 20 associated with the user group ID, by referring to the sensor master data 41. The determination unit 52 then determines whether the sensor information of the sensor device 20 associated with the user group ID has been received from any of the mobile terminals 22 belonging to the user group for each user group, by referring to the reception status data 42 at a predetermined time interval. For example, the determination unit 52 determines whether there is a record in which the sensor ID of the sensor device 20 associated with the user group ID and the terminal ID of the mobile terminal 22 belonging to the user group have been registered within a predetermined time, in the reception status data 42.

If there is no such record, the communication unit 53 transmits a signal of transmission instruction to the access point 21 that manages the respective sensor devices 20 associated with the user group ID to transmit the latest sensor information to the respective mobile terminals 22 belonging to the user group.

Accordingly, for example, even if one of two residents living in the home H exits, the mobile terminal 22 held by the other resident relays the sensor information to the information processing apparatus 23. Therefore, it can be suppressed that the sensor information is uselessly notified to the mobile terminal 22 of the resident who has exited the home H.

Effect

The sensor device 20 according to the present embodiment is configured that it can be associated with the plurality of mobile terminals 22. The information processing apparatus 23 detects whether the sensor information of the sensor device 20 registered in association with the mobile terminals 22 has not been received from any of the mobile terminals 22 for a predetermined time or more. Upon detection that the sensor information is not received, the information processing apparatus 23 transmits a signal to the access point 21 instructing to transmit the latest sensor information to the mobile terminals 22. Accordingly, for example, if the sensor information has been received by any of the grouped mobile terminals 22, generation of an unnecessary alert can be suppressed.

[c] Third Embodiment

A third embodiment is described next. The configurations of the system 10 and the information processing apparatus 23 according to the third embodiment are substantially identical to those of the second embodiment illustrated in FIGS. 8 and 9, and thus parts different from the second embodiment are mainly described.

The information processing apparatus 23 according to the third embodiment is configured to be capable of grouping a plurality of sensor devices 20 and managing the sensor devices as a sensor group. For example, a plurality of sensor devices 20 arranged in the monitoring target home H are grouped and managed.

Figure 12:
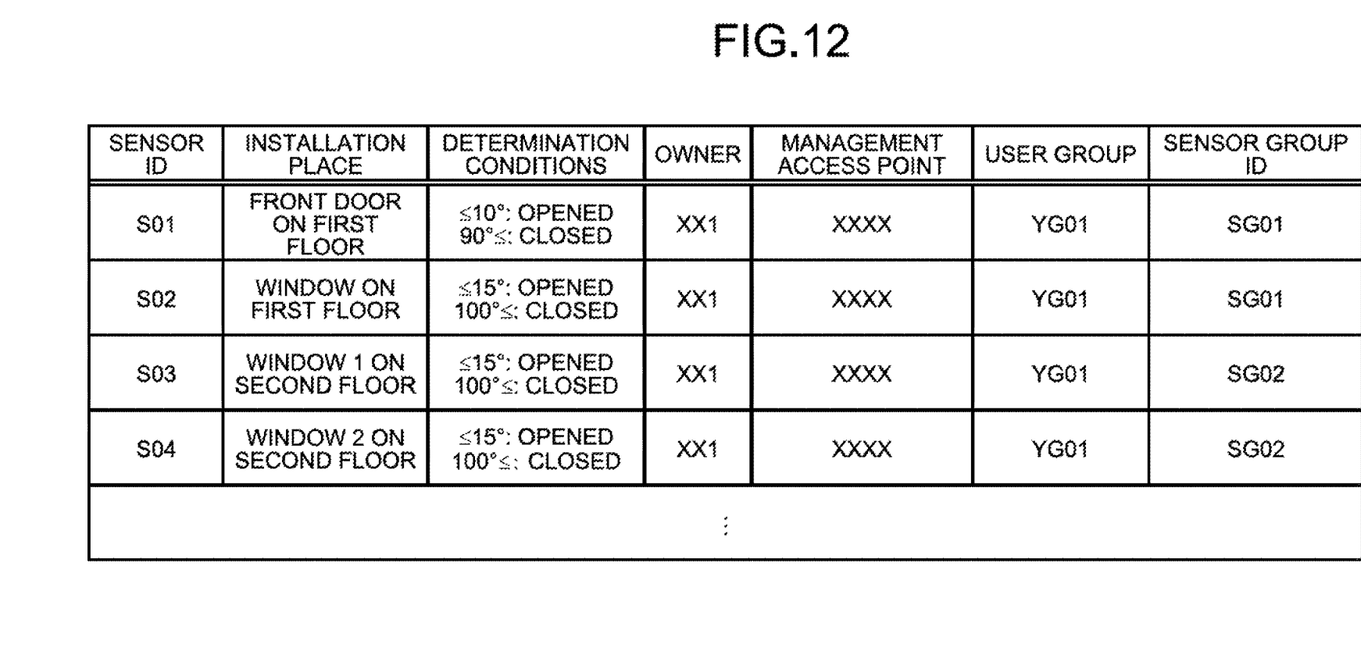
FIG. 12 is a diagram illustrating an example of a data configuration of sensor master data according to a third embodiment.

FIG. 12 is a diagram illustrating an example of a data configuration of the sensor master data according to the third embodiment. As illustrated in FIG. 12, the sensor master data 41 further includes an item of "sensor group ID". The item of "sensor group ID" is a region in which the sensor group ID of the sensor group associated with the sensor device 20 is memorized.

The reception unit 50 receives registration of the sensor group ID with respect to the sensor device 20 from the operation screen. For example, when the sensor devices 20 installed on the first floor of the home H and the sensor devices 20 installed on the second floor are grouped, the resident registers different sensor group IDs for the sensor devices 20 installed on the first floor and the sensor devices 20 installed on the second floor. The reception unit 50 registers the registered sensor group IDs in the item of "sensor group ID" in the sensor master data 41.

When the sensor devices 20 is grouped, the determination unit 52 determines for each sensor group whether the sensor information of the sensor device 20 belonging to the sensor group has not been received for a predetermined time or more. For example, the determination unit 52 specifies for each user group the terminal ID of the mobile terminal 22 of the resident belonging to the user group and the user group ID, by referring to the user master data 40. The determination unit 52 further specifies the sensor ID of the sensor device 20 associated with the user group ID and the sensor group ID, by referring to the sensor master data 41. The determination unit 52 specifies the sensor devices 20 in the sensor group having the same sensor group ID. The determination unit 52 then determines, for each sensor group of the user group, whether the pieces of sensor information of the sensor devices 20 in the sensor group have been received from any mobile terminal 22 belonging to the user group by referring to the reception status data 42 at a predetermined time interval. For example, the determination unit 52 determines, for each sensor group of the user group, whether there is a record in which a sensor ID of the sensor device 20 belonging to the sensor group and a terminal ID of the mobile terminal 22 belonging to the user group have been registered within a predetermined time in the reception status data 42.

If there is no such record, the communication unit 53 transmits a signal of transmission instruction to the access point 21 that manages the respective sensor devices 20 belonging to the sensor group, thereby transmitting the latest sensor information to the respective mobile terminals 22 belonging to the user group.

Accordingly, for example, if the sensor information of the sensor device 20 in a sensor group has not been transmitted, the information processing apparatus 23 can cause the latest sensor information of the sensor device 20 in the sensor group to be transmitted, for each sensor group. For example, when the sensor devices 20 on the first floor and the second floor are grouped into different sensor groups, if the pieces of sensor information of the sensor devices 20 installed on the second floor are not transmitted, the information processing apparatus 23 can cause the pieces of latest sensor information of the sensor devices 20 installed on the second floor to be transmitted to the mobile terminal 22.

Effect

The sensor devices 20 according to the present embodiment is configured to be grouped into sensor groups. The information processing apparatus 23 detects for each sensor group whether the sensor information has not been received for a predetermined time or more from any sensor device 20 belonging to the sensor group. Upon detection that the sensor information has not been received, the information processing apparatus 23 transmits a signal to the access point 21 to transmit the pieces of latest sensor information of the sensor devices 20 belonging to the sensor group to the mobile terminal 22. Accordingly, for example, if the pieces of sensor information of the sensor devices 20 in the sensor group are not transmitted, the information processing apparatus 23 can cause, for each sensor group, the pieces of sensor information of the sensor devices 20 in the sensor group to be transmitted.

[d] Fourth Embodiment

While embodiments related to the apparatus disclosed in the present application have been described above, the technique disclosed therein can be carried out in various types of embodiments other than the embodiments described above. Therefore, other embodiments also included in the present invention are described below.

For example, in the embodiments described above, a case where a monitoring target is the home H has been described as an example. However, the present invention is not limited to this case. The monitoring target can be any place or object. For example, the monitoring target is set as an automobile, and the locking state of a vehicle can be notified.

In the first embodiment, when the pieces of sensor information of the sensor devices 20 registered in association with the mobile terminal 22 have not been transmitted from the mobile terminal 22 for a predetermined time or more, the information processing apparatus 23 can transmit a signal to the access point 21 to transmit the pieces of latest sensor information to the mobile terminal 22.

The respective constituent elements of respective devices illustrated in the drawings are functionally conceptual, and physically the same configuration as illustrated in the drawings is not always necessary. That is, the specific states of distribution and integration of the devices are not limited to those illustrated in the drawings, and a part or all thereof can be functionally or physically distributed or integrated in an arbitrary unit according to various kinds of loads and the status of use. For example, respective processing units of the information processing apparatus 23, the reception unit 50, the storage unit 51, the determination unit 52, and the communication unit 53 can be integrated or divided as appropriate. Further, a part or all of the respective processing functions executed in respective processing units in the information processing apparatus 23 can be realized by a CPU and a program analyzed and executed by the CPU, or can be realized as hardware by a wired logic.

Transmission Control Program

Figure 13:
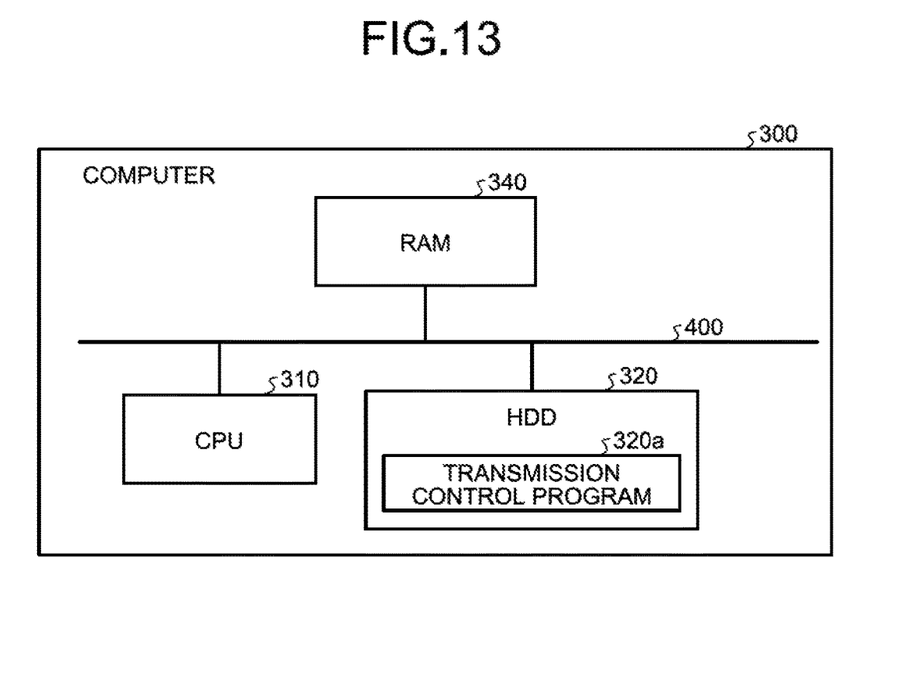
FIG. 13 is a diagram illustrating a computer that executes a transmission control program.

Further, various processes described in the above embodiments can be realized by executing a program prepared in advance by a computer system such as a personal computer or a workstation. Therefore, an example of the computer system that executes the program having the similar functions to the embodiments described above is described below. FIG. 13 is a diagram illustrating a computer that executes a transmission control program.

As illustrated in FIG. 13, a computer 300 includes a CPU 310, an HDD (Hard Disk Drive) 320, and a RAM (Random Access Memory) 340. The respective units 310 to 340 are connected to each other via a bus 400.

A transmission control program 320*a* that exerts the same functions as those of the reception unit 50, the storage unit 51, the determination unit 52, and the communication unit 53 of the information processing apparatus 23 of the embodiments described above is memorized in advance in the HDD 320. The transmission control program 320*a* can be separated appropriately.

The HDD 320 memorizes various types of data therein. For example, the HDD 320 memorizes therein an OS and various types of data.

The CPU 310 reads the transmission control program 320*a* from the HDD 320 and executes the transmission control program 320*a,* thereby performing the same operations as the reception unit 50, the storage unit 51, the determination unit 52, and the communication unit 53. That is, the transmission control program 320*a* performs the same operations as the reception unit 50, the storage unit 51, the determination unit 52, and the communication unit 53.

It is not always needed that the transmission control program 320a described above is stored in the HDD 320 in the first place. For example, the program is stored in a "portable physical medium", such as a flexible disk (FD), a Compact Disk Read Only Memory (CD-ROM), a Digital Versatile Disk (DVD), an optical disk, or an IC card, to be inserted into the computer 300. The computer 300 can read out the program from such a medium and execute the program.

Further, the program is stored in "other computers (or servers)" connected to the computer 300 via a public communication line, the Internet, a LAN, or a WAN. The computer 300 can read out the program from the other computers (or servers) and execute the program.

According to an embodiment of the present invention, it is possible to suppress generation of an unnecessary alert.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising: a processor that executes a process, the process comprising:
    detecting that sensor information of any sensor, among a sensor group registered associated with a mobile terminal that transmits sensor information, upon reception of the sensor information from a sensor capable of transmitting a radio signal, has not been acquired from the mobile terminal for a predetermined time or more; and
    transmitting a signal to a wireless access point to transmit latest sensor information acquired from the sensor to the mobile terminal when detecting that sensor information of any sensor has not been acquired from the mobile terminal for a predetermined time or more.

2. The information processing apparatus according to claim 1, wherein the sensor group is two or more sensors.

3. The information processing apparatus according to claim 1, wherein the sensor included in the sensor group is a sensor installed at a position of exiting and entering a predetermined facility.

4. The information processing apparatus according to claim 1, wherein the sensor information is information related to a motion that is detectable by the sensor.

5. The information processing apparatus according to claim 1, wherein
    the sensor group is registered associated with a plurality of mobile terminals,
    the detecting detects that sensor information of any sensor, among the sensor group registered associated with the mobile terminals, has not been received from any of the mobile terminals for the predetermined time or more, and
    the transmitting transmits a signal to the wireless access point to transmit latest sensor information to the mobile terminals.

6. The information processing apparatus according claim 1, wherein
    the sensor groups are configured to be capable of being grouped,
    the detecting detects for each group that sensor information has not been received from any sensor belonging to the group for the predetermined time or more, and
    the transmitting transmits a signal to the wireless access point to transmit the latest sensor information of a sensor belonging to the group to the mobile terminal.

7. A non-transitory computer-readable recording medium having stored therein a program that causes a computer to execute a process comprising:
    detecting that sensor information of any sensor, among a sensor group registered associated with a mobile terminal that transmits sensor information, upon reception of the sensor information from a sensor capable of transmitting a radio signal, has not been acquired from the mobile terminal for a predetermined time or more; and
    transmitting a signal to a wireless access point to transmit latest sensor information acquired from the sensor to the mobile terminal when detecting that sensor information of any sensor has not been acquired from the mobile terminal for a predetermined time or more.

8. A transmission control method comprising:
    detecting, by a processor, that sensor information of any sensor, among a sensor group registered associated with a mobile terminal that transmits sensor information, upon reception of the sensor information from a sensor capable of transmitting a radio signal, has not been acquired from the mobile terminal for a predetermined time or more; and
    transmitting, by the processor, a signal to a wireless access point to transmit latest sensor information acquired from the sensor to the mobile terminal when detecting that sensor information of any sensor has not been acquired from the mobile terminal for a predetermined time or more.

* * * * *